(12) United States Patent
Krishnamoorthy et al.

(10) Patent No.: US 9,661,088 B2
(45) Date of Patent: May 23, 2017

(54) METHOD AND APPARATUS FOR DETERMINING USER BROWSING BEHAVIOR

(71) Applicant: 24/7 CUSTOMER, INC., Campbell, CA (US)

(72) Inventors: Prabhakaran Krishnamoorthy, Bangalore (IN); Sourabh Chaki, Bangalore (IN); Neha Verma, Bangalore (IN)

(73) Assignee: 24/7 CUSTOMER, INC., Campbell, CA (US)

( * ) Notice: Subject to any disclaimer, the term of this patent is extended or adjusted under 35 U.S.C. 154(b) by 380 days.

(21) Appl. No.: 14/320,440

(22) Filed: Jun. 30, 2014

(65) Prior Publication Data

US 2015/0007065 A1 Jan. 1, 2015

Related U.S. Application Data

(60) Provisional application No. 61/841,832, filed on Jul. 1, 2013.

(51) Int. Cl.
| | |
|---|---|
| *G06F 3/14* | (2006.01) |
| *H04L 29/08* | (2006.01) |
| *G06F 3/0483* | (2013.01) |
| *G06Q 30/02* | (2012.01) |

(52) U.S. Cl.
CPC ............ *H04L 67/22* (2013.01); *G06F 3/0483* (2013.01); *G06Q 30/0202* (2013.01); *H04L 67/02* (2013.01)

(58) Field of Classification Search
CPC .................................... G06F 3/14; G06F 3/17

USPC ............... 715/760; 709/224; 706/46; 704/3; 705/14.43, 14.52; 726/1
See application file for complete search history.

(56) References Cited

U.S. PATENT DOCUMENTS

| | | |
|---|---|---|
| 6,260,036 B1 | 7/2001 | Almasi et al. |
| 2006/0112123 A1 | 5/2006 | Clark et al. |
| 2006/0230058 A1 | 10/2006 | Morris et al. |
| 2007/0005646 A1* | 1/2007 | Dumais ............. G06F 17/30867 |
| 2008/0120406 A1 | 5/2008 | Ahmed et al. |
| 2009/0254971 A1* | 10/2009 | Herz ...................... G06Q 10/10 726/1 |
| 2011/0082984 A1 | 4/2011 | Yuan |
| 2011/0172987 A1* | 7/2011 | Kent ...................... G06F 17/241 704/3 |
| 2011/0239138 A1 | 9/2011 | Galushka et al. |
| 2012/0076283 A1 | 3/2012 | Ajmera et al. |
| 2013/0031490 A1 | 1/2013 | Joo et al. |

(Continued)

*Primary Examiner* — Ruay Ho
(74) *Attorney, Agent, or Firm* — Perkins Coie LLP; Michael A. Glenn (57) ABSTRACT

A computer implemented method and an apparatus for determining user browsing behavior are provided. One or more web pages corresponding to a web domain are configured by associating the one or more web pages with tags. A control file is downloaded on a user device when a first web page access by a user to a tagged web page from among the one or more tagged web pages is detected. The control file facilitates recording of user activity related to a web domain on one or more tabs of a web browser associated with the user device. Recorded user activity corresponding to at least one web browsing session is received and user browsing behavior is determined based on the recorded user activity.

31 Claims, 5 Drawing Sheets

(56) References Cited

U.S. PATENT DOCUMENTS

| | | | |
|---|---|---|---|
| 2013/0198125 A1* | 8/2013 | Oliver | G06Q 30/0246 |
| | | | 706/46 |
| 2013/0246609 A1* | 9/2013 | Topchy | G06F 17/30899 |
| | | | 709/224 |
| 2013/0325603 A1* | 12/2013 | Shamir | G06Q 30/0251 |
| | | | 705/14.52 |
| 2014/0156383 A1* | 6/2014 | Vijayaraghavan | G06Q 30/0256 |
| | | | 705/14.43 |

* cited by examiner

METHOD AND APPARATUS FOR DETERMINING USER BROWSING BEHAVIOR

CROSS-REFERENCE TO RELATED APPLICATIONS

This application claims the benefit of U.S. provisional patent application Ser. No. 61/841,832, filed on Jul. 1, 2013, which application is incorporated herein in its entirety by this reference thereto.

FIELD

The invention generally relates to web browsing and more particularly to determining user browsing behavior.

BACKGROUND

User devices, such as computers, laptops, tablets, Smart phones and the like, typically include a software application called a web browser (hereinafter referred to as a browser) for facilitating user access to information on the World Wide Web (also hereinafter referred to as the web). Examples of the browser may include, but are not limited to, Internet Explorer® browser, Safari® browser, Firefox® browser and the like. The information on the web is disposed in form of web pages containing textual content, images, videos, and/or other types of multimedia content. Related web pages, which are hosted on one or more web servers and which are served from a single web domain (i.e. unique web address) constitute a website. A website may be accessed via a network, such as the Internet, using a uniform resource locator (URL) address. Users connected to such a network may access and browse web pages/websites using the browser installed on the user devices.

With rising popularity of the web, browsers are being constantly upgraded with additional features to provide access to content in an organized manner so as to enhance a user browsing experience. For example, the browsers include a tab feature, which enables a user to access multiple web pages or multiple instances of a web page within a same window of a browser. The tab based browsing facilitates clutter free access to web page/website content as users can simultaneously access multiple web pages and move back and forth between web pages with minimum effort. Further, switching back to a web page precludes unnecessary reloading of the web page.

However, the use of multiple tabs within the same window has made it difficult for conventional mechanisms to determine user browsing behavior with desired degree of accuracy. For example, conventional mechanisms measure metrics like an order of accessing web pages (for example, without taking into account web pages which are revisited in the order), time spent on an open web page and the like, to determine user browsing behavior. However, in the case of tab based browsing, a user may open a web page in a tab and actually not spend time on that web page and/or switch back and forth between the tabs/web pages, thereby rendering determination of user browsing behavior to be complicated.

SUMMARY

Various methods and apparatuses for determining user browsing behavior are disclosed. In an embodiment, a computer-implemented method for determining a user browsing behavior is disclosed. The method includes associating one or more web pages corresponding to a web domain with tags by an apparatus to configure one or more tagged web pages. The method further includes facilitating downloading of a control file on a user device upon detecting a first web page access event corresponding to a tagged web page from among the one or more tagged web pages by the apparatus. The control file is configured to facilitate recording of user activity related to the web domain on one or more tabs of a web browser associated with the user device. The method further includes receiving, by the apparatus, recorded user activity corresponding to at least one web browsing session. Further, the method includes determining, by the apparatus, a user browsing behavior based on the recorded user activity.

In another embodiment, the apparatus for determining user browsing behavior is disclosed. The apparatus includes at least one processor and a memory. The memory is adapted to store machine executable instructions therein, that when executed by the at least one processor, cause the apparatus to associate one or more web pages corresponding to a web domain with tags to configure one or more tagged web pages. The apparatus is further caused to facilitate downloading of a control file on a user device upon detecting a first web page access event corresponding to a tagged web page from among the one or more tagged web pages. The control file is configured to facilitate recording of user activity related to the web domain on one or more tabs of a web browser associated with the user device. The apparatus is further caused to receive recorded user activity corresponding to at least one web browsing session. Further, the apparatus is caused to determine a user browsing behavior based on the recorded user activity.

The drawings referred to in this description are not to be understood as being drawn to scale except if specifically noted, and such drawings are only exemplary in nature.

DETAILED DESCRIPTION

Figure 1:
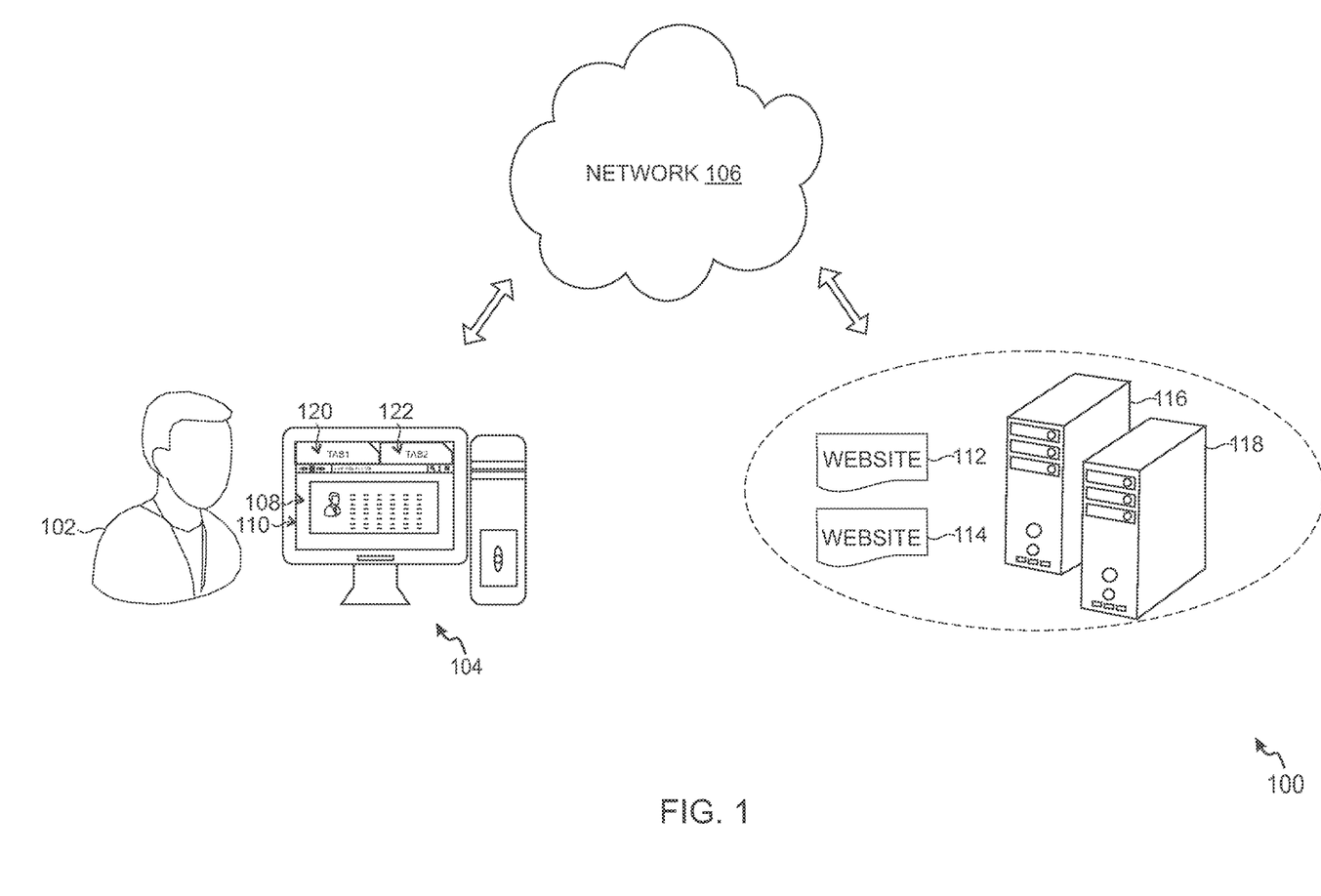
FIG. 1 is a schematic diagram showing an example environment in which various embodiments of the present technology may be practiced.

FIG. 1 is a schematic diagram showing an example environment 100 in which various embodiments of the present technology may be practiced. The environment 100 depicts a user 102 associated with an electronic device 104 (hereinafter referred to as user device 104). Though, the user device 104 is depicted to be a desktop computer in the environment 100, it is understood that the user device 104 may not be limited to the desktop computer. For example, the user device 104 may be any one device from among a laptop, a tablet device, a mobile phone, a Smartphone, a personal digital assistant, a Smart watch, a web-enabled pair of glasses and the like. The user device 104 is capable of connecting to a network 106 for accessing the World Wide Web (also referred to herein as the web). Examples of the network 106 may include wired networks, wireless networks or a combination thereof. Examples of wired networks may include Ethernet, local area network (LAN), fiber-optic cable network and the like. Examples of wireless networks may include cellular networks like GSM/3G/4G/CDMA networks, wireless LAN, blue-tooth or Zigbee networks and the like. Examples of combination of wired and wireless networks may include the Internet.

In various scenarios, the user device 104 may typically include a software application called a web browser (also hereinafter referred to as a browser). Pursuant to an exemplary scenario, the user device 104 may include one or more browsers, such as an example browser 108, displayed on a display screen 110 associated with the user device 104. Examples of the browser 108 may include, but are not limited to, an Internet Explorer® browser, a Safari® browser, a Firefox® browser and the like. The browsers, such as the browser 108, are configured to facilitate user access to information on the web. The information on the web is disposed in form of web pages containing textual content, images, videos, and/or other types of multimedia content. In an example scenario, related web pages, which are hosted on one or more web servers and which are served from a single web domain (i.e. unique web address) constitute a website. A website may be accessed via a network such as the network 106 using a uniform resource locator (URL) address. In an example scenario, the user may access one or more websites, such as websites 112 and 114 on the web. The websites 112 and 114 may be hosted on web servers, such as web servers 116 and 118, which may be accessed via the network 106. Examples of the websites 112 and 114 may include enterprise websites, news portals, gaming portals, educational websites, e-commerce websites, social networking websites and the like. It is understood that the environment is depicted to include two websites 112 and 114 for example purposes and that the web may include a plurality of such websites. Further, the environment may include a plurality of users similar to the user 102, which are capable of accessing a plurality of websites such as the websites 112 and 114.

Pursuant to an exemplary scenario, the browsers may be configured with features designed to facilitate access to web content in an organized manner. For example, the web browsers may include a tab feature, which is configured to enable users to access multiple web pages or multiple instances of a web page in the same window of the web browsers thereby simplifying back and forth switching between the web pages. In an example scenario, the user 102 may access one or more web pages (such as web pages associated with any of the websites 112 and 114) using one or more tabs, such as tabs 120 and 122 in a same window of the browser 108 as depicted in the display screen 110. However, the use of multiple tabs within the same window has made it difficult for conventional mechanisms to determine user's browsing behavior with desired degree of accuracy. For example, conventional mechanisms measure metrics like an order of accessing web pages (for example, without taking into account web pages which are revisited in the order), time spent on an open web page and the like, to determine user browsing behavior. However, in the case of tab based browsing, a user may open a web page in a tab and actually not spend time on that web page and/or switch back and forth between the tabs/web pages, thereby rendering determination of user's browsing behavior to be complicated. An example apparatus configured to determine user browsing behavior is explained with reference to FIG. 2.

Figure 2:
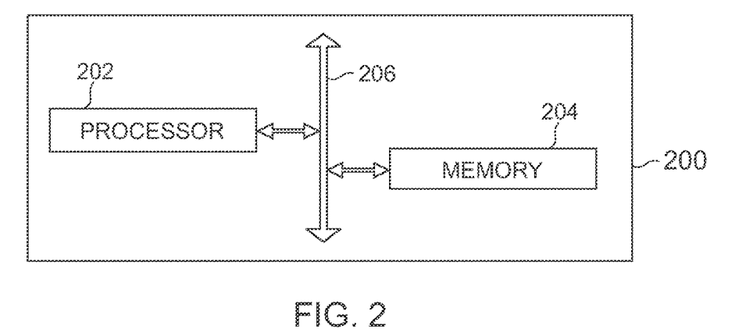
FIG. 2 is a block diagram of an example apparatus configured to determine user browsing behavior in accordance with an embodiment.

FIG. 2 is a block diagram of an example apparatus 200 configured to determine user browsing behavior in accordance with an embodiment. In an embodiment, the apparatus 200 may be deployed, wholly or partially, in a web server communicably associated other web servers hosting websites, such as the web servers 116 and 118 explained with reference to FIG. 1. Pursuant to an exemplary scenario, the apparatus 200 may be any machine capable of executing a set of instructions (sequential and/or otherwise) so as to determine browsing behavior of users of websites.

The apparatus 200 includes at least one processor, such as the processor 202 and a memory 204. It is noted that though the apparatus 200 is depicted to include only one processor, the apparatus 200 may include more number of processors therein. In an embodiment, the processor 202 and the memory 204 are configured to communicate with each other via or through a bus 206. Examples of the bus 206 may include, but are not limited to, a data bus, an address bus, a control bus, and the like. The bus 206 may be, for example, a serial bus, a bi-directional bus or a unidirectional bus.

In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed. The processor 202 may include, among other things, a clock, an arithmetic logic unit (ALU) and logic gates configured to support an operation of the processor 202. The memory 204 may be embodied as one or more volatile memory devices, one or more non-volatile memory devices, and/or a combination of one or more volatile memory devices and non-volatile memory devices. For example, the memory 204 may be embodied as a magnetic storage device (such as hard disk drive, floppy disk, magnetic tape, and the like), an optical magnetic storage device (for example, magneto-optical disk), CD-ROM (compact disc read only memory), CD-R (compact disc recordable), CD-R/W (compact disc rewritable), DVD (Digital Versatile Disc), BD (Blu-ray® Disc), and semiconductor memory (such as mask ROM, PROM (programmable ROM), EPROM (erasable PROM), flash ROM, RAM (random access memory), and the like.

In an embodiment, the processor 202 is configured to, with the content of the memory 204, cause the apparatus 200 to associate one or more web pages corresponding to a web domain with tags to configure one or more tagged web pages. In an embodiment, a tag may correspond to a software code portion, included within a source code associated with the one or more web pages. For example, one or more web pages may be tagged using a hypertext markup language (HTML) based tag or a Java Script based tag. In an illustrative example, a web domain associated with the domain address "www.webpage.com" may include a plurality of web pages. One or more web pages from among the plurality of web pages, such as for example a home page and/or a web page related to payments associated with the web domain, may be tagged with Java Script tags (or even HTML tags) to configure the tagged web pages.

In an embodiment, the processor 202 is configured to, with the content of the memory 204, cause the apparatus 200 to facilitate downloading of a control file on a user device upon detecting a first web page access event corresponding to a tagged web page. As explained with reference to FIG. 1, a user may utilize a device, such as the user device 104 for accessing web pages over the network 106. If a user accesses a tagged web page, then a tag associated with the tagged web page may be configured to enable downloading of a control file on the user device. In an illustrative example, the tag may communicate an accessing of the tagged web page to the apparatus 200. The apparatus 200, upon receiving the communication from the tag, may detect the first web page access event and initiate transmission of the control file over a network, such as the network 106 explained with reference to FIG. 1, to facilitate downloading of the control file. In an embodiment, the control file may be provisioned by the apparatus 200 along with web page content requested by the user upon detecting the first web page access event. In an embodiment, the apparatus 200 is caused to store the control file in a web server hosting the tagged web pages and the web server may provision the control file along with the requested web page content upon detecting the first web page access event. The term 'first web page access event' as used herein refers to a first instance of accessing any one tagged web page from among the one or more tagged web pages associated with the web domain. For example, the first web page access event may be detected upon opening a tagged home page associated with the web domain and a control file may be downloaded on the user device. It is understood that the detection of the first web page access event and the downloading of the control file may not be applicable to subsequent access of the same or other web pages associated with the web domain (or more specifically, the control file corresponding to the web domain may be downloaded only once on the user device for a tagged web page access corresponding to the web domain). In an embodiment, control files associated with one or more web domains, such as the web domain "www.webpage.com", may be stored in the memory 204 of the apparatus 200.

In an embodiment, the control file is configured to facilitate recording of user activity related to the web domain on one or more tabs of a web browser associated with the user device. In an embodiment, the control file is configured to invoke functions in response to a plurality of user action events to facilitate recording of the user activity. A 'user action event' as referred to herein corresponds to one of a tab opening event, a tab closing event, a tab switching event, a web page element selection event on a tab, a focus event on the tab, a mouse click event on the tab, a mouse roll-over (or a mouse over) event on the tab and the like. An example of a web page element selection event may be a selection of an element, such as a hyperlink on the web page or a text entry in text box or highlighting of a textual content on the web page corresponding to a tab. An example of a focus event on the tab may include a multimedia content being viewed or an image being zoomed into on the web page corresponding to the tab. In an illustrative example, the control file may include script, for example Java Script, corresponding to events such as for example an onload event, an unload event, an onfocus event, an unfocus event, and an onblur event, which are capable of triggering functions in response to user action events, such as opening a tab, leaving a tab, entering a tab, closing a tab and the like to facilitate in recording of the user activity. In an embodiment, the recorded user activity includes information related to at least one of: (1) a tab access sequence; (2) a tab switching sequence; (3) a tab closing sequence; (4) a tab active time; (5) a tab idle time; (6) a tab visit frequency; (7) a web page uniform resource locator (URL) associated with each tab from among the one or more tabs; (8) last active tab; (9) a web page selection events associated with the one or more tabs; (10) focus events on the one or more tabs; (11) mouse click events on the one or more tabs; and (12) mouse roll-over events on the one or more tabs. It is noted that by recording a URL (or web page) associated with each tab, the control file in effect records a web page access sequence, a web page switching sequence, a web page closing sequence, a time spent on each web page (for example, from the recorded tab active time), a time for which the web page is idle (for example, a time for which a web page was not attended to by the user), a last active web page (for example, last web page open before closing the browser), selection events like mouse clicks or roll-overs on each web page or time spent on individual web page or web page elements. In an embodiment, the control file is further configured to facilitate recording of the user activity related to the web domain on one or more windows of the web browser associated with the user device. More specifically, in addition to recording user activity on the one or more tabs of the browser, the control file is also configured to record user activity related to the web domain on one or more windows associated with the browser. In an embodiment, the control file may facilitate recording of each user action event till at least one tab/window associated with the web domain is open. Upon closing of all the tabs/windows, the control file may be configured to be deactivated. The recording of the user activity is explained with reference to an illustrative example depicted in the Table 1 below.

An example user activity recorded is depicted in Table 1 below for illustration purposes. It is noted that 'Web Page 1', in Table 1 above, corresponds to tagged web page (or more specifically, a web page associated with a tag as explained above) from among one or more tagged web pages in a web domain. An accessing of the 'Web Page 1' by a user may result in detection of the first web page access event and a control file may be downloaded on the user device to record user activity related to the web domain on the one or more tabs of a web browser associated with the user device as explained above. From the Table 1, it can be seen that the 'Web Page 1' may be opened in 'Tab 1' of a web browser associated with the user device at time instance '$T_1$'. A tab opening event may accordingly be recorded among other user action events on the 'Tab 1', such as mouse clicks and focus events as explained above. The 'Web Page 1' is depicted to be active at '$T_1$'. At time instance '$T_2$', another web page 'Web Page 2' is opened in 'Tab 1' (implying that 'Web Page 1' is unloaded from the web browser) and a new web page 'Web Page 3' is open in a new tab 'Tab 2'. Moreover, the user focus is on 'Tab 1' as implied by the active status of the 'Web Page 2'. At time instance '$T_3$', a tab switching event may be recorded as depicted by switching of an active status from 'Web Page 2' in 'Tab 1' to 'Web Page 3' in 'Tab 2'. At time instance '$T_4$', a tab opening event is recorded as depicted by opening of a new web page 'Web Page 5' in 'Tab 3'. Further, the user may have accessed a new web page 'Web Page 4' in 'Tab 2'. A current focus event at time instance '$T_4$' may be 'Tab 3' as reflected by the active status associated with the 'Web Page 5'. At time instance '$T_5$', a tab closing event corresponding to 'Tab 3' may be detected. Further, the focus event at time instance '$T_5$' may be 'Tab 1' as reflected by the active status associated with the 'Web Page 2'. At time instance '$T_6$', another tab closing event corresponding to 'Tab 1' may be detected. Further, the focus event at time instance '$T_6$' may be 'Tab 2' as reflected by the active status associated with the 'Web Page 4'. At time instance '$T_7$', an end of a web browsing session may be detected upon detecting of last active tab in 'Tab 2'. It is noted that though user activity as explained herein is depicted to be recorded at periodic time instances, it is understood, that events may be invoked by the script included in the control file upon detecting an user action event, such as a tab opening event, a tab closing event, a tab switching event, a web element selection event, a focus event, a mouse click event, a mouse roll over event as explained above. The recorded user activity, such as the recorded user activity in Table 1, may be converted into a structured format (as will be explained later with reference to Tables 2 and 3) and analyzed to derive information, such as tab visit sequence, average time spent on tabs and the like to facilitate in determining a user browsing behavior.

TABLE 1

Recording of User Activity

| Time Instance | Tab 1 | Tab 2 | Tab 3 |
|---|---|---|---|
| $T_1$ | Web Page 1 (Active) | | |
| $T_2$ | Web Page 2 (Active) | Web Page 3 (Not Active) | |
| $T_3$ | Web Page 2 (Not Active) | Web Page 3 (Active) | |
| $T_4$ | Web Page 2 (Not Active) | Web Page 4 (Not Active) | Web Page 5 (Active) |
| $T_5$ | Web Page 2 (Active) | Web Page 4 (Not Active) | Tab 3 Closed |
| $T_6$ | Tab 1 Closed | Web Page 4 (Active) | |
| $T_7$ | | Tab 2 Closed | |

In various scenarios, some web pages corresponding to the web domain may include dynamically updated content. For example, web pages corresponding to social networking sites, news sites, etc. undergo frequent change in content. In an embodiment, recording the user activity related to the web domain comprises recording the user activity related to one or more updated sections on the at least one web page comprising the dynamically updated content. More specifically, the control file may be configured to treat web pages including dynamic content as web pages with logical sections. In such cases, the changes in the web pages may be considered as addition/deletion to the logical sections and the user actions corresponding to each logical section may be recorded separately. For example, in an embodiment, the addition of new content to a web page may be treated as a separate web page and tab related metrics (for example, time spent on the web page, idle time and the like) corresponding to the new web page may be logged for recording the user activity. In an illustrative example, each section of such a web page may be associated with an identification (ID) configured to provide bi-directional mapping between a section and its content. Accordingly, user activity related to each section may be recorded by retrieving the original content associated with the each section using the corresponding IDs and identifying the change therein.

In an embodiment, the processor 202 is configured to, with the content of the memory 204, cause the apparatus 200 to receive recorded user activity corresponding to at least one web browsing session. In an embodiment, the web browsing session refers to a time period for which a user engages in browsing web pages corresponding to the web domain. In another embodiment, the web browsing session may refer to a time period for which at least one tab is active (or open) in a browser from the time a web page corresponding to the web domain was accessed in the browser. As explained above, the determination of whether at least one tab is active may be performed based on events fired upon user action events like closing a tab. Alternatively, in an embodiment, determination of whether at least one tab is active may be performed based on a polling mechanism, also referred to as a heartbeat, wherein a web page (and by extension, a corresponding tab within a web browser) is configured ping its host server at regular intervals so as to indicate its active nature. Upon a cessation of reception of the heartbeat corresponding to the web page, a closing of the corresponding tab may be determined. In an embodiment, the user activity corresponding to the web browsing session is recorded in one of a browser storage and a cookie storage associated with the user device on an on-going basis. More specifically, when a user opens a tab/window or leaves a tab/window related to the web domain, the Java Script in the control file may add required information in the browser/cookie storage associated with the user device and upon completion of one or more web browsing sessions may transmit the recorded user activity to the apparatus 200 over the network. Alternatively, the control file may be configured to transmit the recorded user activity to the apparatus 200 on the on-going basis precluding storage on the user device.

In an embodiment, the processor 202 is configured to, with the content of the memory 204, cause the apparatus 200 to convert the recorded user activity to a structured format configured to facilitate determining of the user browsing behavior. In an embodiment, the data corresponding to the recorded user activity may include numerical, text and/or categorical information. The data may be organized into a suitable structured format such as a tabular format (for example, a rectangle table or a row-by-column format) or a graphical format and stored. For example, the rectangular format may be embodied as (1) table with URL, visit frequency, time spent on each visit, total time spent, average time spent and the like (2) list with page open order (3) list with page close order and the like. The structured format may further facilitate filtering of entries in the table/list based on various dimension, such as (a) >, <, = to certain value, (b) time spent on web page (c) number of webpage/tab visits or (d) number of times webpage/tabs opened/closed, and the like. In an embodiment, the structured format is chosen such that various machine learning and data mining techniques may be applied on the structured data, such as a logistic regression model, decision trees, artificial neural network, support vector machine and so on. In an illustrative example, converting the recorded user activity into graphical format may include generating a tab visit sequence configured to depict a sequence of accessing tabs from among the one or more tabs. A tab visit sequence is explained in more detail with reference to FIG. 5.

In an embodiment, the processor 202 is configured to, with the content of the memory 204, cause the apparatus 200 to determine a user browsing behavior based on the recorded user activity. More specifically, the apparatus 200 is caused to analyze the recorded user activity using one or more analytical algorithms upon conversion into the structured format for determining the user browsing behavior. Examples of such algorithms may include, but are not limited to, one of a logistic regression model based algorithm, a decision tree based algorithm, artificial neural network based algorithm and support vector machines based algorithm. In an embodiment, the apparatus 200 is further caused to receive at least one of user location information, user profile information, user purchase history, user device information, user browser information and user interaction information corresponding to user interactions with one or more active agents. In an embodiment, the apparatus 200 may be caused to combine analysis of recorded user activity with received user information to derive meaningful information and/or relationships for determining user browsing behavior as will be explained below.

In an embodiment, determination of the user browsing behavior corresponds to determining user behavioral attributes like an order of accessing web pages related to the web domain, an order of web pages followed to lead into a web page associated with payment for a product or a service, an average time spent on the web domain, a visit frequency corresponding to the web domain and an average time spent on the one or more web pages corresponding to the web domain.

In an embodiment, the processor 202 is configured to, with the content of the memory 204, cause the apparatus 200 to predict user intent based on the determined user browsing behavior. For example, user browsing behavior may be determined for a plurality of users and the collated data may be subjected to a set of text mining & predictive models (hereinafter collectively referred to as prediction models) stored in the memory 204 for mining relevant information that drive the prediction of the user intent. Examples of the prediction models may include, but are not limited to logistic regression, naïve Bayesian, rule engines, neural networks, decision trees, support vector machines, k-nearest neighbor, k-means and the like. The prediction models may be configured to combine received user information, such as user location information, user profile information, user purchase history, user device information, user browser information and user interaction information with recorded/analyzed user activity to extract certain features that may then be fed into the prediction models. Examples of the features that may be fed into the prediction models may include, but are not limited to, any combinations of words features such as n-grams, unigrams, bigrams and trigrams, word phrases, part-of-speech of words, sentiment of words, sentiment of sentences, position of words, user keyword searches, user click data, user web journeys, the user interaction history and the like. In an embodiment, the prediction models may utilize any combination of the above-mentioned input features along with the user interaction data such as, but not limited to, which agent handled the dialogue, what the outcome was, interaction transfers if any and the like to predict likely user intents. The mined information enables the apparatus 200 to infer intent of a visitor for being present on the website. For example, the apparatus 200 may be caused to predict user actions, such as next tab/webpage that the user may open and a sequence of switching tabs/web pages that the user may follow and the like. Further, if a URL is opened in multiple tabs, then information such as number of times opened and total time corresponding to the URL (for example, by aggregating time on multiple tabs) may be identified to deduce meaningful predictions. The predictions may be utilized in a number of ways as explained below.

In an embodiment, the processor 202 is configured to, with the content of the memory 204, cause the apparatus 200 to perform, upon predicting the user intent, at least one of: (1) proactively provision, at least one specific web page from among the one or more web pages related to the web domain during an ongoing user web browsing session; (2) offer assistance through interaction with an active agent using one of a text chat medium, a voice chat medium and a video chat medium; (3) offer at least one discount at an appropriate web page from among the one or more web pages related to the web domain; and (4) provide at least one promotional offer at an appropriate web page from among the one or more web pages related to the web domain. More specifically, the predictions may be used for (1) targeting right tab/right time to interact with a visitor (2) proactively opening required tabs/pages depending on mathematical model's (i.e. model used for prediction) output to help a user (3) interacting with the appropriate tab (for chat interaction, for discounting coupon and the like, for example, if a user is marked for interaction then offering the interaction on right tab instead of offering on current tab). Further, the predictions may be utilized to develop rules which may be applied to an input, such as recorded user activity (for example, in a structured format) to provide output in form of predictions specific to the input (for example, whether the user associated with the recorded user activity is going to make a purchase or not or whether the user would prefer chat with an agent on a particular tab/page and the like).

In an embodiment, the processor 202 is configured to, with the content of the memory 204, cause the apparatus 200 to segment a plurality of users visiting the one or more tagged web pages into homogeneous groups based on commonality in at least one of location, user profile, purchasing history, device information, browser information, agent interaction information and user activity corresponding to the plurality of users. In an embodiment, at least one algorithm from among a probabilistic latent semantic analysis (PLSA) based algorithm and a self-organizing maps based algorithm may be used to segment the users into homogenous groups like those including users using particular browsers, users interested in certain products and the like. In an embodiment, the segment labels along with the weights determined by the PLSA of the important attributes and/or combination of attributes such as location, products viewed, past purchases and so on may be stored within the memory 204. In an embodiment, the apparatus 200 is further caused to construct one or more user behavioral models based on the segmentation of the plurality of users into the homogenous groups. In an embodiment, the apparatus 200 is caused to predict at least one next user action during an on-going web browsing session for at least one user from among the plurality of users based on the one or more user behavioral models and a sequence of tabs visited during the on-going web browsing session. For example, based on a partial navigational path, i.e. the sequence of web pages/tabs visited by the visitor, the apparatus 200 may model the next action of a user during an on-going web browsing session and at each stage the apparatus 200 may decide what appropriate pre-emptive action and/or engagement strategy can be utilized to maximize the metrics of the interest, such as conversion rate or resolving the user's problems (resolution rate). In an embodiment, the apparatus 200 may be caused to use models such as Markov models of higher orders combined with Neural network, Support Vector machine, Collaborative filtering, Sequential Pattern methods, Survival Analyses, and some such similar tools for the said modeling. In an embodiment, determining the appropriate pre-emptive action and/or engagement strategy may involve proactively offering suitable personalized recommendation and/or best multichannel support to the user such as personalized recommendation using a suitable widget, chat engagement and so on, based on the predicted intent.

It is understood that though the determination of user browsing behavior is explained above with reference to a single tagged web domain, a plurality of web pages corresponding to a plurality of web domains may be tagged by the apparatus 200 for determining the user browsing behavior. Moreover, it is noted that user activity on one or more windows is also recorded by the apparatus 200 in a manner similar to a recording of user activity on the one or more tabs of the browser for determining the user browsing behavior. An example sequence of operations performed by the apparatus 200 of FIG. 2 is explained with reference to FIG. 3.

Figure 3:
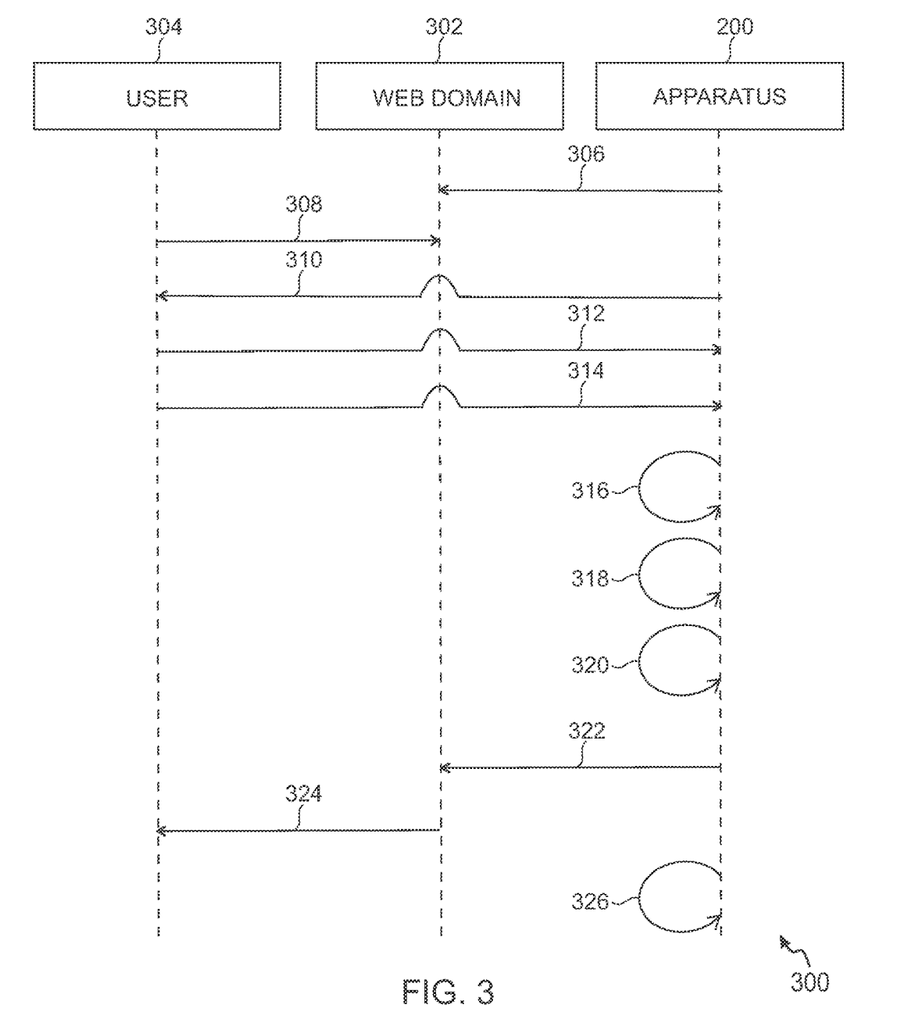
FIG. 3 is a schematic diagram showing an example sequence of operations associated with determination of user browsing behavior by the apparatus of FIG. 2 in accordance with an embodiment.

FIG. 3 is a schematic diagram 300 showing an example sequence of operations associated with determination of user browsing behavior by the apparatus 200 of FIG. 2 in accordance with an embodiment. The sequence of operations is explained with reference to an example web domain (exemplarily represented by block 302 and referred to herein as web domain 302) and an example user of the web domain 302 (exemplarily represented by block 304 and referred to herein as user 304). The apparatus 200 is communicably associated with the web domain 302 and the user 304 for example over a network, such as the network 106 of FIG. 1. The sequence of operations starts at operation 306.

At operation 306, the apparatus 200 associates one or more web pages from among a plurality of web pages corresponding to the web domain 302 with tags to configure one or more tagged web pages. As explained with reference to FIG. 2, the apparatus 200 may associate one or more web pages with Java Script based tags or HTML based tags. At operation 308, the user 304 accesses one or more tagged web pages related to the web domain 302. At operation 310, a control file is downloaded on a user device upon detecting a first web page access event corresponding to a tagged web page. More specifically, if a user accesses a tagged web page, then a tag associated with the tagged web page may be configured to enable downloading of the control file on the user device. In an embodiment, the control file may be provisioned by the web domain 302 along with web page content requested by the user upon detecting the first web page access event. In another embodiment, the tag may communicate an accessing of the tagged web page to the apparatus 200. The apparatus 200, upon receiving the communication from the tag, may detect the first web page access event and initiate transmission of the control file over the network to facilitate downloading of the control file. In an embodiment, the control file may be provisioned by the apparatus 200 along with web page content requested by the user 304 upon detecting the first web page access event. As explained with reference to FIG. 2, the term 'first web page access event' refers to a first instance of accessing any one tagged web page from among the plurality of web pages associated with the web domain 302. The control file is configured to facilitate recording of user activity related to the web domain 302 on one or more tabs of a web browser associated with the user device. For example, the control file is configured to invoke functions in response to plurality of user action events like a tab opening event, a tab closing event, a tab switching event, a web page element selection event on a tab from among the one or more tabs, a focus event on the tab, a mouse click event on the tab, a mouse roll-over event on the tab and the like, to facilitate recording of the user activity. Examples of recorded user activity are explained with reference to FIG. 2 and are not explained herein.

At operation 312, the apparatus 200 receives recorded user activity corresponding to at least one web browsing session from the user 304 (or more specifically, from the user device over the network). As explained with reference to FIG. 2, the term 'web browsing session' refers to a time period for which user engages in browsing web pages corresponding to the web domain 302, or, to a time period for which at least one tab is active (or open) in a browser from the time a web page corresponding to the web domain 302 was accessed in the browser. In an embodiment, the user activity corresponding to the web browsing sessions is recorded in one of a browser storage and a cookie storage associated with the user device on an on-going basis. More specifically, when the user 304 opens a tab/window or leaves a tab/window related to the web domain 302, the Java Script in the control file may add required information in the browser/cookie storage associated with the user device and upon completion of one or more web browsing sessions may transmit the recorded user activity to the apparatus 200 over the network. Alternatively, the control file may be configured to transmit the recorded user activity to the apparatus 200 on the on-going basis precluding storage on the user device.

At operation 314, the apparatus 200 receives at least one of user location information, user profile information, user purchase history, user device information, user browser information and user interaction information corresponding to user interactions with one or more active agents. At operation 316, the apparatus 200 converts the recorded user activity to a structured format configured to facilitate determining of the user browsing behavior. For example, numerical, text and/or categorical information related to the recorded user activity may be organized into a suitable structured format such as a tabular format (for example, a rectangle table or a row-by-column format) or a graphical format and for enabling application of various machine learning and data mining techniques to facilitate analysis of the recorded user activity.

At operation 318, the apparatus 200 determines a user browsing behavior based on the recorded user activity. More specifically, the apparatus 200 is caused to analyze the recorded user activity using one or more analytical algorithms upon conversion into the structured format for determining the user browsing behavior. Examples of such algorithms may include, but are not limited to, one of a logistic regression model based algorithm, a decision tree based algorithm, artificial neural network based algorithm and support vector machines based algorithm. In an embodiment, the apparatus 200 may be caused to combine analysis of recorded user activity with received user information to derive meaningful information and/or relationships for determining user behavioral attributes like an order of accessing web pages related to the web domain 302, an order of web pages followed to lead into a web page associated with payment for a product or a service, an average time spent on the web domain 302, a visit frequency corresponding to the web domain 302 and an average time spent on the one or more web pages corresponding to the web domain 302.

At operation 320, the apparatus 200 predicts user intent based on the determined user browsing behavior. For example, user browsing behavior may be determined for a plurality of users and the collated data may be subjected to a set of prediction models as explained with reference to FIG. 2 to predict user actions, such as next tab/webpage that the user 304 may open and a sequence of switching tabs/web pages that the user 304 may follow. The predictions may be utilized in a number of ways as explained with reference to FIG. 2 and are not explained herein.

At operation 322, apparatus 200 determines next user actions based on the predicted intent and accordingly provide personalized interaction on the web domain 302 to the user 304. For example, the apparatus 200 may proactively open a web page (that the user 304 may have accessed next during the on-going web browsing session), offer assistance in form of interaction with active agents on right tab/web page on the web domain, provide discounts or promotional offers at right opportunity during on-going web journey and the like. At operation 324, the web domain 302 may provision the personalized experience to the user 304.

At operation 326, the apparatus 200 segments a plurality of users visiting the one or more tagged web pages related to the web domain 302 into homogeneous groups based on commonality in at least one of location, user profile, purchasing history, device information, browser information, user interaction information and user activity corresponding to the plurality of users. The apparatus 200 is further configured to model the next actions of the plurality of users as the users perform their respective web browsing sessions and at each stage the apparatus 200 may decide what appropriate pre-emptive action and/or engagement strategy can be utilized to maximize the metrics of the interest, such as conversion rate or resolving the user's problems (resolution rate) as explained with reference to FIG. 2. It is noted that various blocks and operations described with reference to FIG. 3 may be performed in sequential order, simultaneously, parallel, or a combination thereof. Further, in some embodiments, some of the blocks and/or operations may be omitted, skipped, modified, or added without departing from scope of the present technology. The determination of user browsing behavior, using an apparatus, such as the apparatus 200, is further explained using an illustrative example, with reference to FIGS. 4, 5 and 6.

Figure 4:
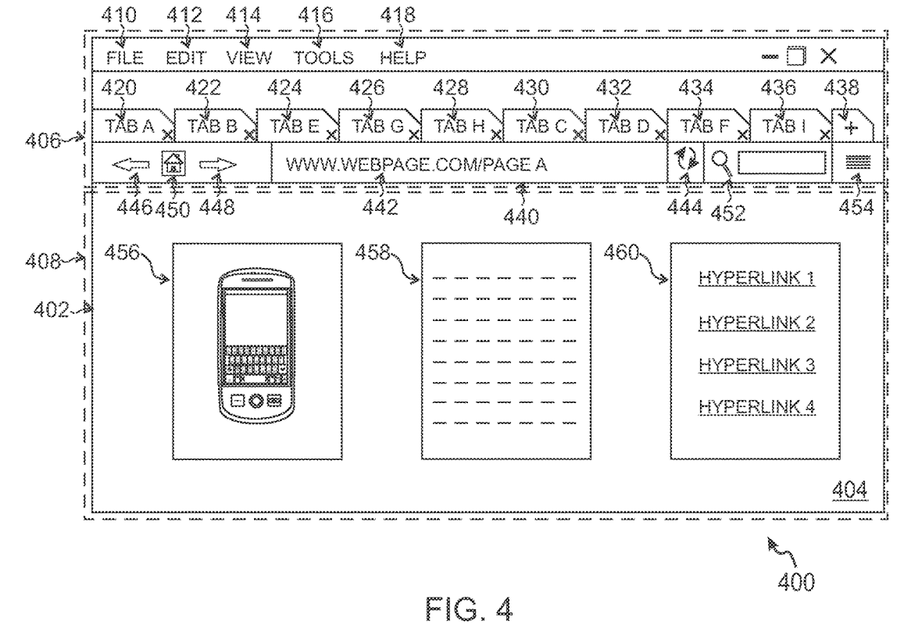
FIG. 4 illustrates an example screenshot of a user device screen displaying a web browser facilitating tab based web browsing in accordance with an example scenario.

Referring now to FIG. 4, an example screenshot 400 of a user device screen displaying a web browser 402 facilitating tab based web browsing is illustrated in accordance with an example scenario. Examples of the web browser 402 may include, but are not limited to popular web browsers, such as Internet Explorer® web browser, Safari® web browser, Chrome™ web browser and Mozilla® web browser or even proprietary web browsers. The web browser 402 is configured to display a plurality of web pages, such as the web page 404, corresponding to a web domain, represented by a website address (or URL) 'www.webpage.com'.

The web browser 402 includes a menu section 406 and web page display section 408. The menu section 406 displays standard menu options such as "File 410", "Edit 412", "View 414", "Tools 416" and "Help 418". It is noted that the menu options are depicted for example purposes and that the menu section 406 may include fewer or more number of menu options than those displayed in FIG. 4. Further, each menu option may be configured to display upon clicking, a drop down list of secondary menu options. For example, upon clicking on the "File 410" menu option, a drop down list of secondary menu options (not shown in FIG. 4) such as "New Window", "New Tab", "Open location", "Save As" and the like may be displayed. Each of the secondary menu options may be associated with an intended functionality. For example, the "New Window" secondary menu option may facilitate an opening of a new browser window. Similarly, the "Save As" secondary menu option may facilitate saving of the UI on display in one of various formats, such as for example a hyper text markup language (HTML) format or a text format. Each of the menu options such as "Edit 412", "View 414", "Tools 416" and "Help 418" may similarly include secondary menu options with associated functionalities.

The menu section 406 depicts a plurality of tabs, such as tabs 420, 422, 424, 426, 428, 430, 432, 434, 436 and 438. For purposes of the description of FIGS. 4, 5 and 6, a tab is addressed herein with reference to a web page address that is being displayed in the tab. For example, a tab displaying page A is addressed herein as "tab A". Similarly, a tab displaying web page B is addressed herein as "tab B" and so on and so forth. Accordingly, the tabs 420, 422, 424, 426, 428, 430, 432, 434, 436 and 438 depicted in FIG. 4 are hereinafter referred to as "tab A", "tab B", "tab E", "tab G", "tab H", "tab C", "tab D", "tab F", "tab I" and "New tab", respectively. Further, the menu section 406 includes a text entry bar 440 configured to enable a user to enter URLs (such as the website URL 'www.webpage.com/page A', which is hereinafter referred to as URL 442). The text entry bar 440 also includes a refresh icon 444 capable of re-sending the HTTP request for re-fetching the web page URL 442. The menu section 406 also includes a plurality of icons, such as icons 446, 448, 450 providing quick access to a previously accessed webpage, a subsequently accessed page and a home page respectively. A search icon 452 configured to enable a user to perform a keyword search in search engines, such as Google® search engine, a Yahoo® search engine or any such conventional or proprietary search engines and a user options icon 454 configured to enable a user to set user preferences and browser settings are also included in the menu section 406.

The web page display section 408 depicts the web page 404 corresponding to "Tab A" and URL "www.webpage.com/page A". The web page 404 is depicted to display graphical content 456 (for example, an image of a mobile phone), textual content 458 and hyperlink content 460 including one or more hyperlinks, such as hyperlink 1, hyperlink 2, hyperlink 3 and hyperlink 4. It is noted that the content displayed on the web page 404, such as the graphical content 456, the textual content 458, and the hyperlink content 460 are depicted herein for exemplary purposes. The one or more hyperlinks, such as hyperlinks 1 to 4, provide access to other web pages, which may be accessed in separate web browser window or in another tab, such as "New Tab" within the same web browser window or within the same tab (for example, in tab A).

As explained with reference to FIG. 1, the tab feature in the browsers, such as the web browser 402, enables users to access multiple web pages or multiple instances of a web page in the same window of the web browsers thereby simplifying back and forth switching between the web pages. In an example embodiment, one or more web pages corresponding to the web domain "www.webpage.com" may be tagged by the apparatus 200 (explained with reference to FIG. 2) and upon detection of a first web page access event, a control file may be downloaded on the user device. The control file may be configured to invoke functions in response to opening tabs, such as tabs A to I, or switching between the tabs. Further, as explained with reference to FIGS. 2 and 3, the apparatus 200 may receive the recorded user activity and convert the recorded user activity in a structured format suitable for applying machine-learning or data mining techniques. In an embodiment, a tab visit sequence may be generated based on the recorded user activity corresponding to the web domain "www.web-page.com". The generated tab visit sequence is explained with reference to FIG. 5.

Figure 5:
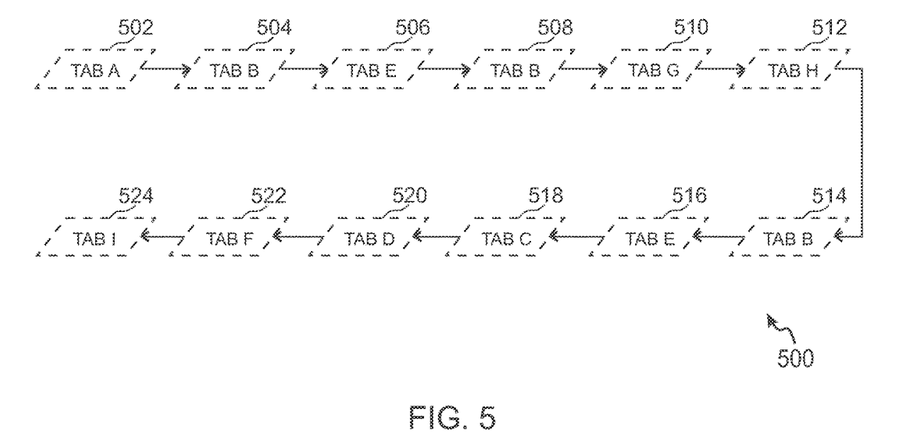
FIG. 5 is a schematic diagram showing an example tab visit sequence generated based on recorded user activity corresponding to the web domain in accordance with an embodiment.

FIG. 5 is a schematic diagram showing an example tab visit sequence 500 generated based on recorded user activity corresponding to the web domain "www.webpage.com" accessed in FIG. 4 in accordance with an embodiment. As explained with reference to FIG. 2, the tab visit sequence depicts a sequence of web pages accessed by a user during a web browsing session. It is understood that recorded user activity may be utilized for generating various graphs, such as the tab visit sequence 500, and that the analysis of the recorded user activity may not be limited to the tab visit sequence 500.

As can be seen from the tab visit sequence 500 in FIG. 5, a web page domain access (i.e. first web page access event) is initiated at "Tab A" at 502, followed by "Tab B" at 504, "Tab E" at 506, "Tab B" at 508, "Tab G" at 510, "Tab H" at 512, "Tab B" at 514, "Tab E" at 516, "Tab C" at 518, "Tab D" at 520, "Tab F" at 522 and "Tab I" at 524. From the tab visit sequence 500, a number of times each tab is visited may be identified and recorded in a rectangular tabular format as depicted in Table 2 below.

TABLE 2

Tab Visit Sequence

| Tab | Visit Count |
|---|---|
| Tab A | 1 |
| Tab B | 3 |
| Tab C | 1 |
| Tab D | 1 |
| Tab E | 2 |
| Tab F | 1 |
| Tab G | 1 |
| Tab H | 1 |
| Tab I | 1 |

In an embodiment, a time spent on "Tab B" during each user visit may also be recorded as depicted in Table 3

TABLE 3

Time Spent on Tab B

| Visit reference | Time Spent |
|---|---|
| Visit 1 | 30 seconds |
| Visit 2 | 64 seconds |
| Visit 3 | 403 seconds |

In an embodiment, if web page E (i.e. tab E) corresponds to an external web page corresponding to the tagged web domain, then it may be deduced that a particular web page (for example, web page B) usually leads a visitor to exit the web domain, then such cases may be studied and corrective actions may be incorporated. Alternatively, visitors visiting external pages after accessing a particular web page in the web domain may also be studied to determine user browsing behavior. Such recorded user activity corresponding to one or more web browsing sessions may be utilized to determine a user web browsing behavior. In an embodiment, the determined user browsing behavior may used to generate graphical content, such as a tab action graph, which is configured to facilitate prediction of a next user action. A tab action graph is explained with reference to FIG. 6.

Figure 6:
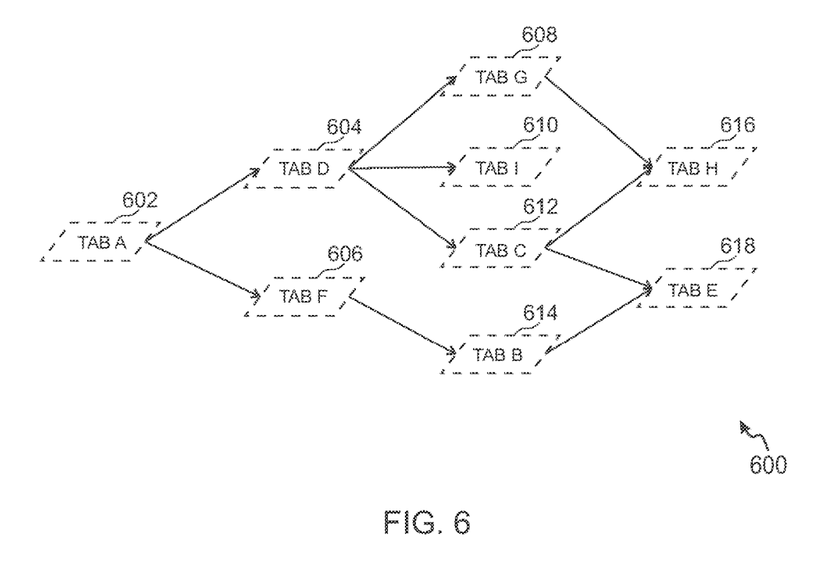
FIG. 6 is a schematic diagram showing an example tab action graph generated based on determined user browsing behavior in accordance with an embodiment.

FIG. 6 is a schematic diagram showing an example tab action graph 600 generated based on determined user browsing behavior in accordance with an embodiment. From the tab action graph 600, it is observed, that the user typically accesses "Tab A" (i.e. web page A, which may correspond to, for example, homepage for the web domain 'www.web-page.com') at 602. "Tab A" at 602, is followed by one of "Tab D" at 604 or "Tab F" at 606. If "Tab D" is accessed at 604, then the following user action is typically a selection of one of "Tab G" at 608, "Tab I" at 610 or "Tab C" at 612. If "Tab I" is selected at 610, then usually the user typically exits the web domain at "Tab I". If any one of "Tab G" or Tab C" is selected, then the following user action may be accessing of "Tab H" at 616. "Tab E" may also be accessed at 618 subsequent to accessing of "Tab C". If "Tab F" selected at 606, then "Tab B" may be selected at 614 followed by "Tab E" at 618.

The tab action graph 600 may provide a number of insights. For example, if "Tab H" is a web page corresponding to product checkout (i.e. product purchase) event, then a path traversed to product checkout may be one of (1) or (2):

$$\text{Tab A} \rightarrow \text{Tab D} \rightarrow \text{Tab G} \rightarrow \text{Tab H} \quad (1)$$

$$\text{Tab A} \rightarrow \text{Tab D} \rightarrow \text{Tab C} \rightarrow \text{Tab H} \quad (2)$$

Accordingly, it is noted that three tabs are visited before product purchase on "Tab H". In an embodiment, for each webpage, entry nodes (i.e. tabs leading into the web page) and an exit nodes (i.e. tabs leading to from the web page) may also be identified. For example, from the tab action graph 600, it can be learnt that for "Tab C", the entry node is "Tab D", whereas the exit nodes are "Tab H" and "Tab E". Based on graphical content, such as the tab action graph 600, an apparatus such as the apparatus 200 explained with reference to FIG. 2, may proactively open a web page (that the user may have accessed next during the on-going web browsing session), offer assistance in form of interaction with active agents on right tab/web page on the web domain, provide discounts or promotional offers at right opportunity during on-going web journey and the like, thereby facilitating personalized web experience to the user. A method for determining user browsing behavior is explained with reference to FIG. 7.

Figure 7:
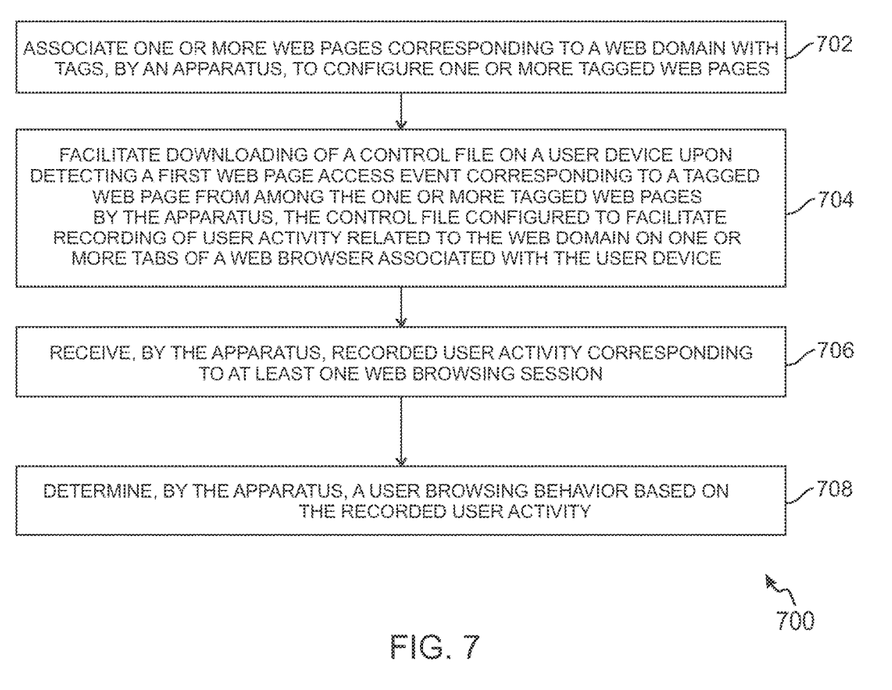
FIG. 7 is a flow diagram of an example method for determining user browsing behavior in accordance with an embodiment.

FIG. 7 is a flow diagram of an example method 700 for determining user browsing behavior in accordance with an embodiment. The method 700 depicted in the flow diagram may be executed by, for example, the apparatus 200 explained with reference to FIGS. 2-6. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the apparatus 200. For example, one or more operations corresponding to the method 700 are explained herein to be executed by the apparatus 200. It is also noted that, the operations of the method 700 can be described and/or practiced by using an apparatus other than the apparatus 200. The method 700 starts at operation 702.

At operation 702, one or more web pages corresponding to a web domain are associated with tags (for example, by an apparatus, such as the apparatus 200) to configure one or more tagged web pages. In an embodiment, a tag may correspond to a software code portion, included within a source code associated with the one or more pages. For example, one or more web pages may be tagged using a hypertext markup language (HTML) based tag or a Java Script based tag.

At operation 704, downloading of a control file on a user device is facilitated by the apparatus upon detecting a first web page access event corresponding to a tagged web page. As explained with reference to FIG. 2, if a user accesses a tagged web page, then a tag associated with the tagged web page may be configured to enable a downloading of a control file on the user device. In an illustrative example, the tag may communicate an accessing of the tagged web page to the apparatus. The apparatus, upon receiving the communication from the tag, may detect the first web page access event and initiate transmission of the control file over a network, such as the network 106 explained with reference to FIG. 1, to facilitate downloading of the control file. In an embodiment, the control file may be provisioned along with web page content requested by the user upon detecting the first web page access event. In an embodiment, the control file may be stored in a web server hosting the tagged web pages by the apparatus and the web server may provision the control file along with the requested web page content upon detecting the first web page access event.

In an embodiment, the control file is configured to facilitate recording of user activity related to the web domain on one or more tabs of a web browser associated with the user device by the apparatus. In an embodiment, the control file is configured to invoke functions in response to a plurality of user action events to facilitate recording of the user activity. As explained with reference to FIG. 2, the 'user action event' corresponds to one of a tab opening event, a tab closing event, a tab switching event, a web page element selection event on a tab from among the one or more tabs, a focus event on the tab, a mouse click event on the tab, a mouse roll-over (or a mouse over) event on the tab and the like. An example of a web page selection event may be a selection of a hyperlink on the web page or a text entry in text box or highlighting of a textual content on the web page. An example of a focus event on the tab may include a multimedia content being viewed or an image being zoomed into on the web page. In an illustrative example, the control file may include script, for example Java Script, corresponding to events such as for example an onload event, an unload event, an onfocus event, an unfocus event, and an onblur event, which are capable of triggering functions in response to user action events, such as opening a tab, leaving a tab, entering a tab, closing a tab and the like to facilitate in recording of the user activity. In an embodiment, the recorded user activity includes information related to at least one of: (1) a tab access sequence; (2) a tab switching sequence; (3) a tab closing sequence; (4) a tab active time; (5) a tab idle time; (6) a tab visit frequency; (7) a web page uniform resource locator (URL) associated with each tab from among the one or more tabs; (8) last active tab; (9) a web page selection events associated with the one or more tabs; (10) focus events on the one or more tabs; (11) mouse click events on the one or more tabs; and (12) mouse roll-over events on the one or more tabs. It is noted that by recording a URL (or web page) associated with each tab, the control file in effect records a web page access sequence, a web page switching sequence, a web page closing sequence, a time spent on each web page (for example, from the recorded tab active time), a time for which the web page is idle (for example, a time for which a web page was not attended to by the user), a last active web page (for example, last web page open before closing the browser), selection events like mouse clicks or roll-overs on each web page or time spent on individual web page or web page elements. In an embodiment, the control file is further configured to facilitate recording of the user activity related to the web domain on one or more windows of the web browser associated with the user device. More specifically, in addition to recording user activity on the one or more tabs of the browser, the control file is also configured to record user activity related to the web domain on one or more windows associated with the browser. In an embodiment, the control file may facilitate recording of each user action event till at least one tab/window associated with the web domain is open. Upon closing of all the tabs/windows, the control file may be configured to be deactivated.

In various scenarios, some web pages corresponding to the web domain may include dynamically updated content. For example, web pages corresponding to social networking sites, news sites, etc. undergo frequent change in content. In an embodiment, recording the user activity related to the web domain comprises recording the user activity related to one or more updated sections on the at least one web page comprising the dynamically updated content. More specifically, the control file may be configured to treat web pages including dynamic content as web pages with logical sections. In such cases, the changes in the web pages may be considered as addition/deletion to the logical sections and the user actions corresponding to each logical section may be recorded separately. For example, in an embodiment, the addition of new content to a web page may be treated as a separate web page and tab related metrics (for example, time spent on the web page, idle time and the like) corresponding to the new web page may be logged for recording the user activity. In an illustrative example, each section of such a web page may be associated with an identification (ID) configured to provide bi-directional mapping between a section and its content. Accordingly, user activity related to each section may be recorded by retrieving the original content associated with the each section using the corresponding IDs and identifying the change therein.

At operation 706, recorded user activity corresponding to at least one web browsing session is received by the apparatus. As explained with reference to FIG. 2, the web browsing session refers to a time period for which user engages in browsing web pages corresponding to the web domain. In another embodiment, the web browsing session may refer to a time period for which at least one tab is active (or open) in a browser from the time a web page corresponding to the web domain was accessed in the browser. The determination of whether at least one tab is active may be performed based on events fired upon user action events like closing a tab or by making use of a polling mechanism, such as the heartbeat, as explained with reference to FIG. 2. In an embodiment, the user activity corresponding to the web browsing session is recorded in one of a browser storage and a cookie storage associated with the user device on an on-going basis. More specifically, when a user opens a tab/window or leaves a tab/window related to the web domain, the Java Script in the control file may add required information in the browser/cookie storage associated with the user device and upon completion of one or more web browsing sessions may transmit the recorded user activity to the apparatus over the network. Alternatively, the control file may be configured to transmit the recorded user activity to the apparatus on the on-going basis precluding storage on the user device.

In an embodiment, the method 700 may include converting the recorded user activity to a structured format configured to facilitate determining of the user browsing behavior. For example, numerical, text and/or categorical information in the data corresponding to the recorded user activity may be organized into a suitable structured format such as a tabular format (for example, a rectangle table or a row-by-column format) or a graphical format and stored. The structured format is chosen such that various machine learning and data mining techniques can be applied on the structured data, such as a logistic regression model, decision trees, artificial neural network, support vector machine and so on. Further, the recorded user activity may be analyzed using one or more analytical algorithms upon conversion into the format for determining the user browsing behavior. Examples of such algorithms may include, but are not limited to, one of a logistic regression model based algorithm, a decision tree based algorithm, artificial neural network based algorithm and support vector machines based algorithm. In an embodiment, at least one of user location information, user profile information, user purchase history, user device information, user browser information and user interaction information corresponding to user interactions with one or more active agents may be received by the apparatus. In an embodiment, the apparatus may be caused to combine analysis of recorded user activity with received user information to derive meaningful information and/or relationships for determining user browsing behavior as explained with reference to FIG. 2.

At operation 708, a user browsing behavior may be determined based on the recorded user activity. In an embodiment, determination of the user browsing behavior corresponds to determining user behavioral attributes like an order of accessing web pages related to the web domain, an order of web pages followed to lead into a web page associated with payment for a product or a service, an average time spent on the web domain, a visit frequency corresponding to the web domain and an average time spent on the one or more web pages corresponding to the web domain.

In an embodiment, the method 700 may further include predicting user intent based on the determined user browsing behavior. For example, user browsing behavior may be determined for a plurality of users and the collated data may be subjected to a set of prediction models (explained with reference to FIG. 2) for mining relevant information that drive the prediction of the user intent. For example, user actions, such as next tab/webpage that the user may open and a sequence of switching tabs/web pages that the user may follow may be predicted based on the mined information. The predictions may be utilized in a number of ways. In an embodiment, the method 700 may include performing, upon predicting the user intent, at least one of: (1) proactively provisioning, at least one specific web page from among the one or more web pages related to the web domain during an ongoing user web browsing session; (2) offering assistance through interaction with an active agent using one of a text chat medium, a voice chat medium and a video chat medium; (3) offering at least one discount at an appropriate web page from among the one or more web pages related to the web domain; and (4) providing at least one promotional offer at an appropriate web page from among the one or more web pages related to the web domain.

In an embodiment, the method 700 may also include segmenting a plurality of users visiting the one or more tagged web pages into homogeneous groups based on commonality in at least one of location, user profile, purchasing history, device information, browser information, agent interaction information and user activity corresponding to the plurality of users. In an embodiment, at least one algorithm from among a Probabilistic latent semantic analysis (PLSA) clustering method based algorithm or Self-organizing maps based algorithm may be used to segment the users into homogenous groups like those including users using particular browsers, users interested in certain products and the like. In an embodiment, the segment labels along with the weights determined by the PLSA of the important attributes and/or combination of attributes such as location, products viewed, past purchases and so on may be stored. In an embodiment, one or more user behavioral models may be constructed based on the segmentation of the plurality of users into the homogenous groups. In an embodiment, a next user action may be predicted during an on-going web browsing session for at least one user from among the plurality of users based on the one or more user behavioral models and a sequence of tabs visited during the on-going web browsing session. For example, based on a partial navigational path, i.e. the sequence of web pages/tabs visited by the visitor, the next action of a user may be modeled as the user engages in the web browsing session and at each stage the apparatus may decide what appropriate pre-emptive action and/or engagement strategy can be utilized to maximize the metrics of the interest, such as conversion rate or resolving the user's problems (resolution rate) as explained with reference to FIG. 2.

Without in any way limiting the scope, interpretation, or application of the claims appearing below, advantages of one or more of the exemplary embodiments disclosed herein include determining and/or understanding user browsing behavior in tab/window based web browsing environment. The various techniques as disclosed herein enable determining user browsing behavioral traits more accurately than the conventional approaches. Further, visitors to the web domain can be treated with appropriate pre-emptive action and/or engagement strategy to maximize the metrics of the interest, such as conversion rate or resolving the user's problems (resolution rate). For example, promotional offers or discount coupons or even offer for chat interaction with an agent may be provisioned on the right tab at right time. The techniques may also be utilized to determine user browsing behavior on multiple windows of the same browser. Furthermore, the approach may be extended to multiple domains wherein the web pages are tagged and a visitor visits web pages from such multiple domains. In case of web pages with dynamic content, the web page may be considered to include logical sections and user actions corresponding to the logical actions may be tracked separately to determine user browsing behavior. Such determination of user browsing behavior enables better prediction of the user's intent. The prediction can be utilized to increase the chances of conversion of user interaction to a sale, and thereby increase revenue and/or enhance the visitor's web experience.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
associating, by a processor, one or more web pages corresponding to a web domain with tags to configure one or more tagged web pages;
facilitating, by the processor, downloading of a control file on a user device upon detecting a first web page access event corresponding to a tagged web page from among the one or more tagged web pages, the control file configured to facilitate recording of user activity related to the web domain on one or more tabs of a web browser associated with the user device;
receiving, by the processor, recorded user activity corresponding to at least one web browsing session;
determining, by the processor, a user browsing behavior based on the recorded user activity;
segmenting, by the processor, a plurality of users visiting the one or more tagged web pages into homogeneous groups based on commonality in at least one of location, user profile, purchasing history, device information, browser information, agent interaction information, and user activity corresponding to the plurality of users;
constructing, by the processor, one or more user behavioral models based on the segmentation of the plurality of users into the homogenous groups; and
predicting, by the processor, at least one next user action during an on-going web browsing session for at least one user from among the plurality of users based on the one or more user behavioral models and a sequence of tabs visited during the on-going web browsing session.

2. The method of claim 1, wherein a tag from among the tags corresponds to one of a hypertext markup language (HTML) based tag and a Java Script based tag.

3. The method of claim 1, wherein the control file is further configured to facilitate recording of the user activity related to the web domain on one or more windows of the web browser associated with the user device.

4. The method of claim 3, wherein the control file is configured to invoke functions in response to a plurality of user action events to facilitate recording of the user activity, wherein a user action event from among the plurality of user action events corresponds to one of a tab opening event, a tab closing event, a tab switching event, a web page element selection event on a tab from among the one or more tabs, a focus event on the tab, a mouse click event on the tab, and a mouse roll-over event on the tab.

5. The method of claim 3, wherein the recorded user activity comprises information related to at least one of:
a tab access sequence;
a tab switching sequence;
a tab closing sequence;
a tab active time;
a tab idle time;
a tab visit frequency;
a web page uniform resource locator (URL) associated with each tab from among the one or more tabs;
last active tab;
web page selection events associated with the one or more tabs;
focus events on the one or more tabs;
mouse click events on the one or more tabs; and
mouse roll-over events on the one or more tabs.

6. The method of claim 5, wherein the user activity is recorded in one of a browser storage and a cookie storage associated with the user device on an on-going basis prior to the reception of the recorded user activity by the apparatus.

7. The method of claim 1, further comprising:
converting, by the apparatus, the recorded user activity to a structured format configured to facilitate determining of the user browsing behavior.

8. The method of claim 7, wherein the structured format is one of a tabular format and a graphical format.

9. The method of claim 7, wherein determining the user browsing behavior comprises:
analyzing the recorded user activity using one or more analytical algorithms upon conversion into the structured format for determining the user browsing behavior, wherein an algorithm from among the one or more analytical algorithms corresponds to one of a logistic regression model based algorithm, a decision tree based algorithm, artificial neural network based algorithm, and support vector machines based algorithm.

10. The method of claim 1, further comprising:
receiving, by the apparatus, at least one of user location information, user profile information, user purchase history, user device information, user browser information, and user interaction information corresponding to user interactions with one or more active agents for facilitating determining of the user browsing behavior.

11. The method of claim 1, wherein determination of the user browsing behavior corresponds to determining user behavioral attributes related to at least one of a user web page access order corresponding to the web domain, an order of web pages leading into a web page associated with payment for a product or a service, a web page order leading to a web page associated with an external domain, an average time spent on the web domain, a visit frequency corresponding to the web domain, and an average time spent on the one or more web pages corresponding to the web domain.

12. The method of claim 1, further comprising:
predicting user intent based on the determined user browsing behavior by the apparatus.

13. The method of claim 12, further comprising performing by the apparatus, upon predicting the user intent, at least one of:
proactively provisioning, at least one specific web page from among the one or more web pages related to the web domain during an ongoing user web browsing session;
offering assistance through interaction with an active agent using one of a text chat medium, a voice chat medium and a video chat medium;
offering at least one discount at an appropriate web page from among the one or more web pages related to the web domain; and
providing at least one promotional offer at an appropriate web page from among the one or more web pages related to the web domain.

14. The method of claim 1, wherein at least one web page from among the one or more web pages corresponding to the web domain comprises dynamically updated content.

15. The method of claim 14, wherein recording the user activity related to the web domain comprises recording the user activity related to one or more updated sections on the at least one web page comprising the dynamically updated content.

16. An apparatus comprising:
 at least one processor; and
 a memory having stored therein machine executable instructions, that when executed by the at least one processor, cause the apparatus to:
  associate one or more web pages corresponding to a web domain with tags to configure one or more tagged web pages;
  facilitate downloading of a control file on a user device upon detecting a first web page access event corresponding to a tagged web page from among the one or more tagged web pages, the control file configured to facilitate recording of user activity related to the web domain on one or more tabs of a web browser associated with the user device;
  receive recorded user activity corresponding to at least one web browsing session;
  determine a user browsing behavior based on the recorded user activity;
  segment a plurality of users visiting the one or more tagged web pages into homogeneous groups based on commonality in at least one of location, user profile, purchasing history, device information, browser information, agent interaction information, and user activity corresponding to the plurality of users;
  construct one or more user behavioral models based on the segmentation of the plurality of users into the homogenous groups; and
  predict at least one next user action during an on-going web browsing session for at least one user from among the plurality of users based on the one or more user behavioral models and a sequence of tabs visited during the on-going web browsing session.

17. The apparatus of claim 16, wherein a tag from among the tags corresponds to one of a hypertext markup language (HTML) based tag and a Java Script based tag.

18. The apparatus of claim 16, wherein the control file is further configured to facilitate recording of the user activity related to the web domain on one or more windows of the web browser associated with the user device.

19. The apparatus of claim 18, wherein the control file is configured to invoke functions in response to a plurality of user action events to facilitate recording of the user activity, wherein a user action event from among the plurality of user action events corresponds to one of a tab opening event, a tab closing event, a tab switching event, a web page element selection event on a tab from among the one or more tabs, a focus event on the tab, a mouse click event on the tab, and a mouse roll-over event on the tab.

20. The apparatus of claim 18, wherein the recorded user activity comprises information related to at least one of:
 a tab access sequence;
 a tab switching sequence;
 a tab closing sequence;
 a tab active time;
 a tab idle time;
 a tab visit frequency;
 a web page uniform resource locator (URL) associated with each tab from among the one or more tabs;
 last active tab;
 web page selection events associated with the one or more tabs;
 focus events on the one or more tabs;
 mouse click events on the one or more tabs; and
 mouse roll-over events on the one or more tabs.

21. The apparatus of claim 20, wherein the user activity is recorded in one of a browser storage and a cookie storage associated with the user device on an on-going basis prior to the reception of the recorded user activity by the apparatus.

22. The apparatus of claim 16, wherein the apparatus is further caused to:
 convert the recorded user activity to a structured format configured to facilitate determining of the user browsing behavior.

23. The apparatus of claim 22, wherein the structured format is one of a tabular format and a graphical format.

24. The apparatus of claim 22, wherein determining the user browsing behavior comprises analyzing the recorded user activity using one or more analytical algorithms upon conversion into the structured format for determining the user browsing behavior, wherein an algorithm from among the one or more analytical algorithms corresponds to one of a logistic regression model based algorithm, a decision tree based algorithm, artificial neural network based algorithm, and support vector machines based algorithm.

25. The apparatus of claim 16, wherein the apparatus is further caused to:
 receive at least one of user location information, user profile information, user purchase history, user device information, user browser information, and user interaction information corresponding to user interactions with one or more active agents for facilitating determining of the user browsing behavior.

26. The apparatus of claim 16, wherein determination of the user browsing behavior corresponds to determining user behavioral attributes related to at least one of a user web page access order corresponding to the web domain, an order of web pages leading into a web page associated with payment for a product or a service, a web page order leading to a web page associated with an external domain, an average time spent on the web domain, a visit frequency corresponding to the web domain, and an average time spent on the one or more web pages corresponding to the web domain.

27. The apparatus of claim 16, wherein the apparatus is further caused to:
 predict user intent based on the determined user browsing behavior.

28. The apparatus of claim 27, wherein the apparatus is further caused to perform, upon predicting the user intent, at least one of:
 proactively provision, at least one specific web page from among the one or more web pages related to the web domain during an ongoing user web browsing session;
 offer assistance through interaction with an active agent using one of a text chat medium, a voice chat medium and a video chat medium;
 offer at least one discount at an appropriate web page from among the one or more web pages related to the web domain; and
 provide at least one promotional offer at an appropriate web page from among the one or more web pages related to the web domain.

29. The apparatus of claim 16, wherein at least one web page from among the one or more web pages corresponding to the web domain comprises dynamically updated content.

30. The apparatus of claim 29, wherein recording the user activity related to the web domain comprises recording the user activity related to one or more updated sections on the at least one web page comprising the dynamically updated content.

31. The apparatus of claim 16, wherein the apparatus is further caused to:
   determine at least one of an appropriate pre-emptive action and engagement strategy for the at least one user for maximizing business metrics related to at least one of conversion rate and user problem resolution rate.

* * * * *